March 17, 1970 G. A. JEAN-MARIE MARTELEE 3,501,040
TRACTION VEHICLE WITH INTERCHANGEABLE BODIES
Filed May 2, 1966 5 Sheets-Sheet 2
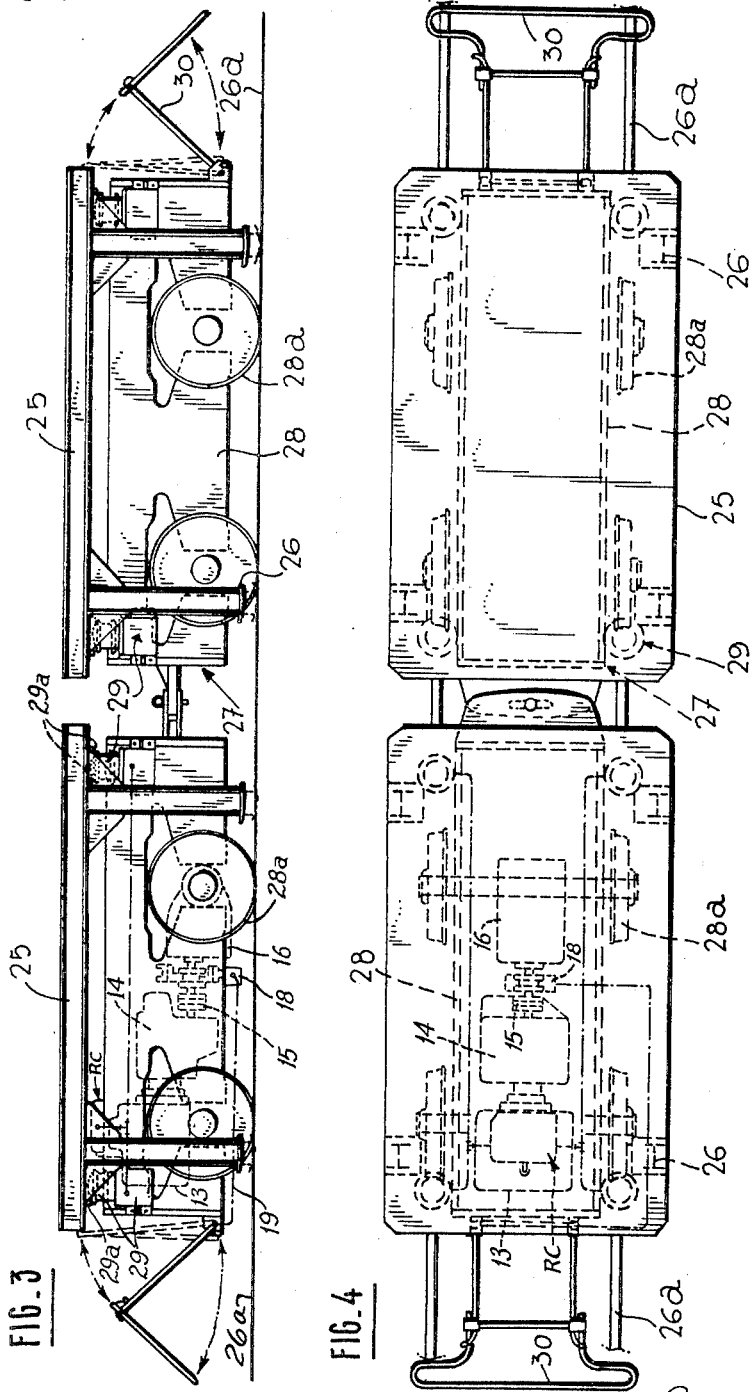
Inventor:
GHISLAIN ANTOINE JEAN-MARIE
MARTELEE

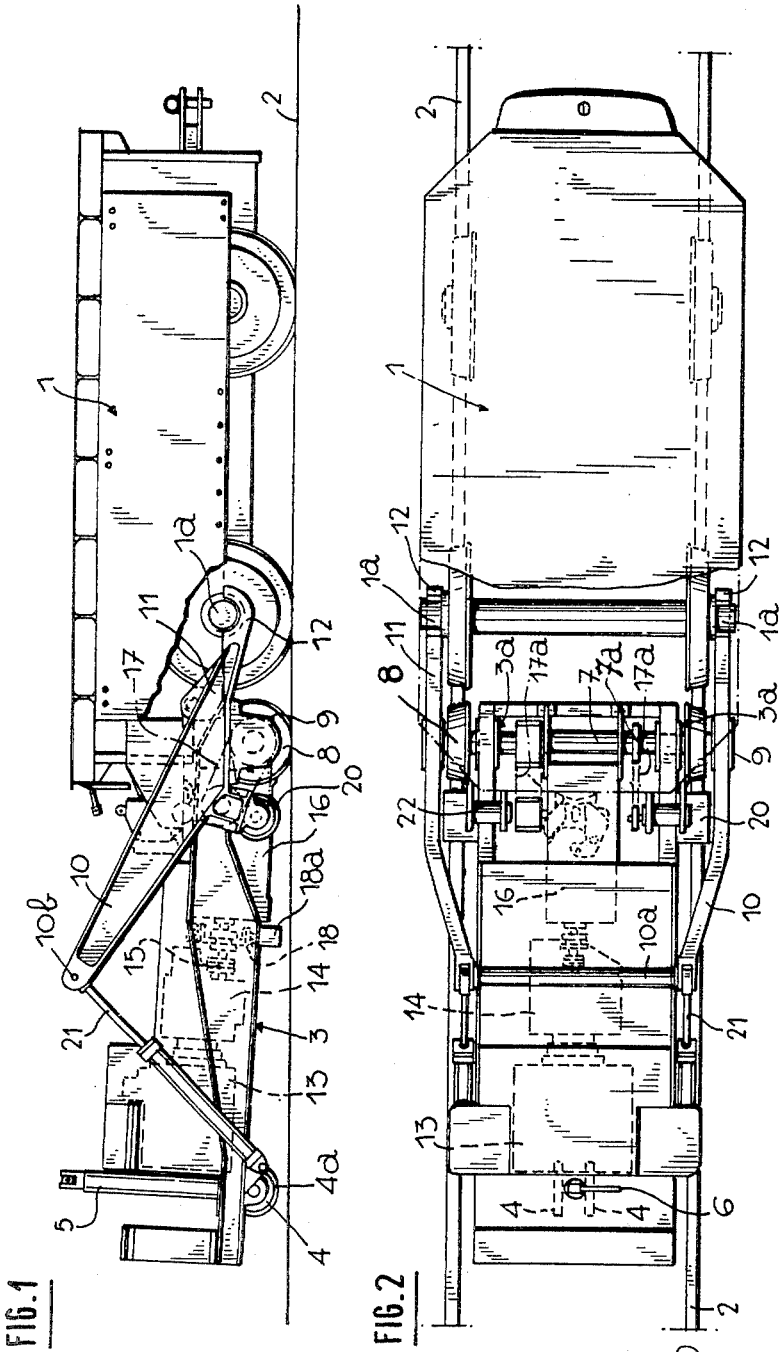

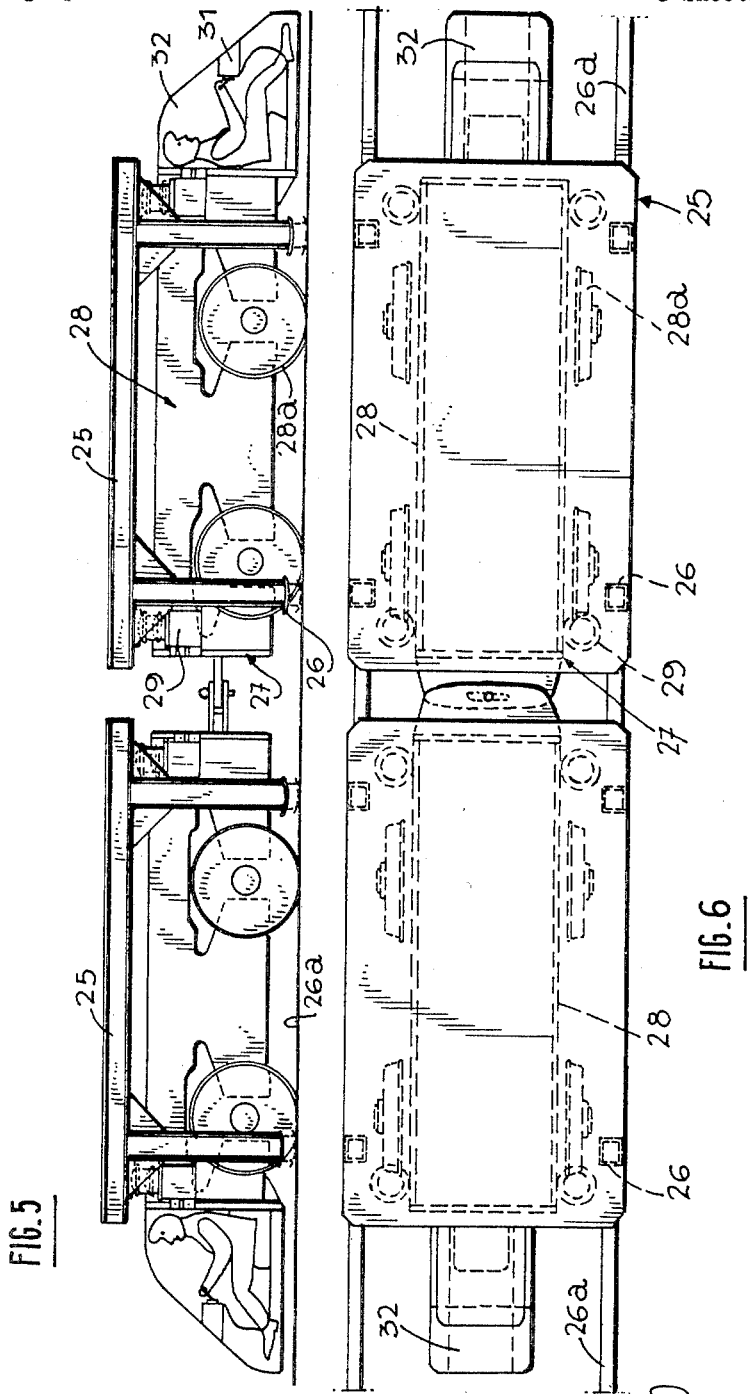

March 17, 1970    G. A. JEAN-MARIE MARTELEE    3,501,040
TRACTION VEHICLE WITH INTERCHANGEABLE BODIES
Filed May 2, 1966      5 Sheets-Sheet 4
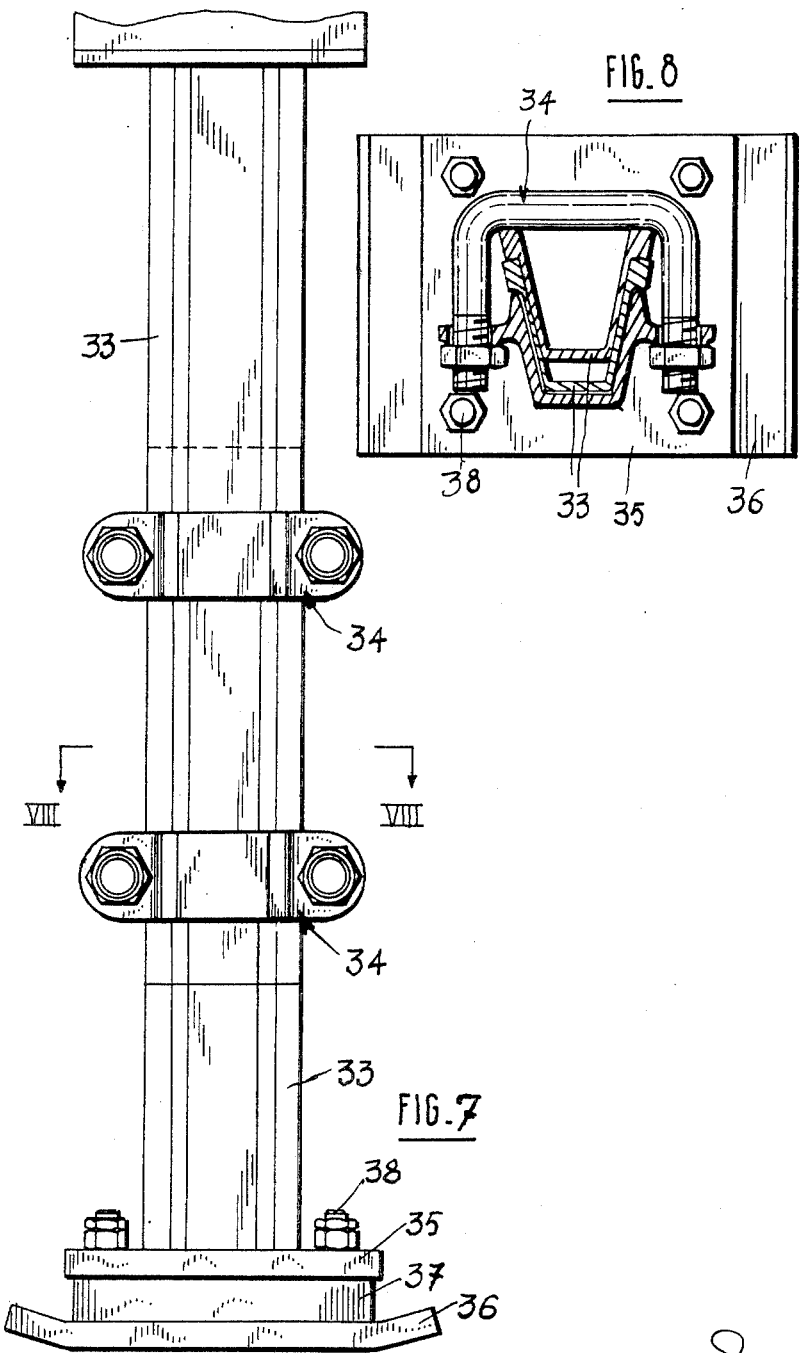

United States Patent Office 3,501,040
Patented Mar. 17, 1970

3,501,040
TRACTION VEHICLE WITH INTERCHANGEABLE BODIES
Ghislain Antoine Jean-Marie Martelee, Liege, Belgium, assignor to Cockerill-Ougree-Providence, Seraing-les-Liege, Belgium
Filed May 2, 1966, Ser. No. 546,642
Claims priority, application Belgium, May 19, 1965, B 6,860, Patent 664,190
Int. Cl. B61f *13/00;* B61g *11/00;* B60p *1/64*
U.S. Cl. 214—515                        10 Claims

ABSTRACT OF THE DISCLOSURE

For moving or conveying heavy loads disposed on a load-carrying means, there is provided a traction vehicle having a rigid frame carrying a driving motor of low power with operating controls, a torque converter, a clutch and a reduction gear. A transmission drives at least one set of metal tired drive wheels which can run on rails and which vehicles can fully be positioned under the load-carrying means from either direction. The load-carrying means, in effect, is like a removable vehicle body in the form of a strong platform table on legs which straddle the rails or other vehicle roadway. A hydraulic device on the vehicle cooperates with and lifts the load-carrying means whereby it is then transported by the vehicle.

---

The invention relates to a method and a pulling device for the moving on rails of heavily laden load-carrying means, more particularly over relatively short distances. Hitherto, to move a load-carrying means such as, for instance, a wagon heavily loaded with, for instance, metallurgical products such as sheet-metal coils, the load-carrying means has been self-propelled or coupled to a traction unit of the locomotive type running on rails or pneumatic tires. The main difficulties to be overcome when moving a heavily laden load-carrying means reside in the pulling and braking forces to be applied to ensure complete safety and efficiency. The moving and acceleration of a heavily laden load-carrying means of course requires the application of a considerable pulling force, more particularly when the track to be covered comprises shallow curves. Moreover, a powerful and reliable braking force must be exerted at the end of the run. Such pulling and braking forces can be produced only by a very heavy pulling means or a self-propelled load-carrying means. These requirements make the prior art systems very expensive.

A self-propelled load-carrying means has the disadvantage of requiring an individual drive system, which makes its price prohibitive and make it an unattractive solution for cases in which a number of load-carrying means have to be moved. When a traction means has to be used, the problem of braking further increases the disadvantages of this solution, since if the conventional braking means are to be adopted a very heavy pulling means has to be used, and it is also very often necessary to brake the load-carrying means also. Either a system of flexible pipes must therefore be used to connect the pulling means to the load-carrying means for the transmission of hydraulic brake fluid controlling the brake system, or an operative has to actuate lever brakes, with consequent risk to man and material.

Another disadvantage of using self-propelled load-carrying means or a pulling means coupled to the load-carrying means is that in view of the considerable weight supported by each axle of the load-carrying means, the axles have to be mounted on roller bearings to reduce the starting torque. Such an assembly considerably increases first costs.

The aforementioned disadvantages of the prior art self-propelled load-carrying means or pulling means are obviated by the invention, which provides a method of moving a heavily laden load-carrying means by means of a pulling carriage also forming part of the invention.

According to the main feature of the invention, at least one drive wheel train rigidly connected to a pulling means is introduced beneath the load-carrying means, whereafter the load-carrying means exerts a lifting force via a hydraulic system to apply to the wheels of the pulling means the load necessary to give them a temporary grip adequate for the pulling and braking forces to be applied reliably and effectively, to enable the heavily laden load-carrying means to be moved and stopped.

The invention also relates to a pulling carriage which, to perform the method according to the invention for moving or conveying heavy loads disposed on a load-carrying means, comprises a strong frame which has at least one train of drive wheels running on rails and can be introduced under the load-carrying means, a means for lifting the load-carrying means being provided, and the drive wheels are driven by an internal combustion engine having a power of the order of 40 H.P. via a hydraulic torque converter, a clutch and a reducing gear.

In a preferred embodiment of the invention, for use more particularly in cases in which at least one wagon with its load has to be towed, the strong frame has at one end at least one rubber tired steering wheel and is borne adjacent its other end by a train of driving wheels which run on rails and are mounted on an axle attached to a frame formed by pivoting longitudinal members having rubber tired wheels, the frame also having arms which terminate at one end in lugs which can be received under an axle of the loaded wagon, hydraulic rams being articulated between the other end of the longitudinal member and the strong frame.

Another embodiment of the invention, which can be used if a load is borne by a type of vehicle body in the form of table resting on supporting feet disposed on either side of the track, enables the whole load to be lifted by making the carriage both a load-carrying and a pulling means.

In the latter embodiment, the leg portions of the table supporting feet are high enough to allow the passage under the table of the whole carriage whose strong frame bears a driving engine, a torque converter, a clutch, a reducing gear and vertically moving hydraulic rams for lifting the loaded table or placing it on its feet which are preferably formed by two channel irons ("Zorrès") telescoped over a portion of their length and gripped together by straps so as to create considerable friction therebetween.

According to another feature of the invention, braking is performed by a hydraulic brake which acts on the primary pinion of the reduction gear and is associated with a spring safety brake.

Other features of the invention will be gathered from the following description of three purely exemplary embodiments thereof, with reference to the accompanying drawings, wherein:

FIGURE 1 is a diagrammatic side elevation of a pulling carriage according to the invention in position for towing a wagon.

FIGURE 2 is a diagrammatic plan view of FIGURE 1.

FIGURES 3 and 4 are a side elevation and a plan view respectively of a second embodiment of a carriage or traction vehicle according to the invention.

FIGURES 5 and 6 are a side elevation and a plan view respectively of a third embodiment of a carriage or traction vehicle according to the invention.

FIGURE 7 is a front elevation, to a different scale, of a table-supporting foot.

FIGURE 8 is a section, taken along the line VIII—VIII in FIGURE 7, and

Figure 9:
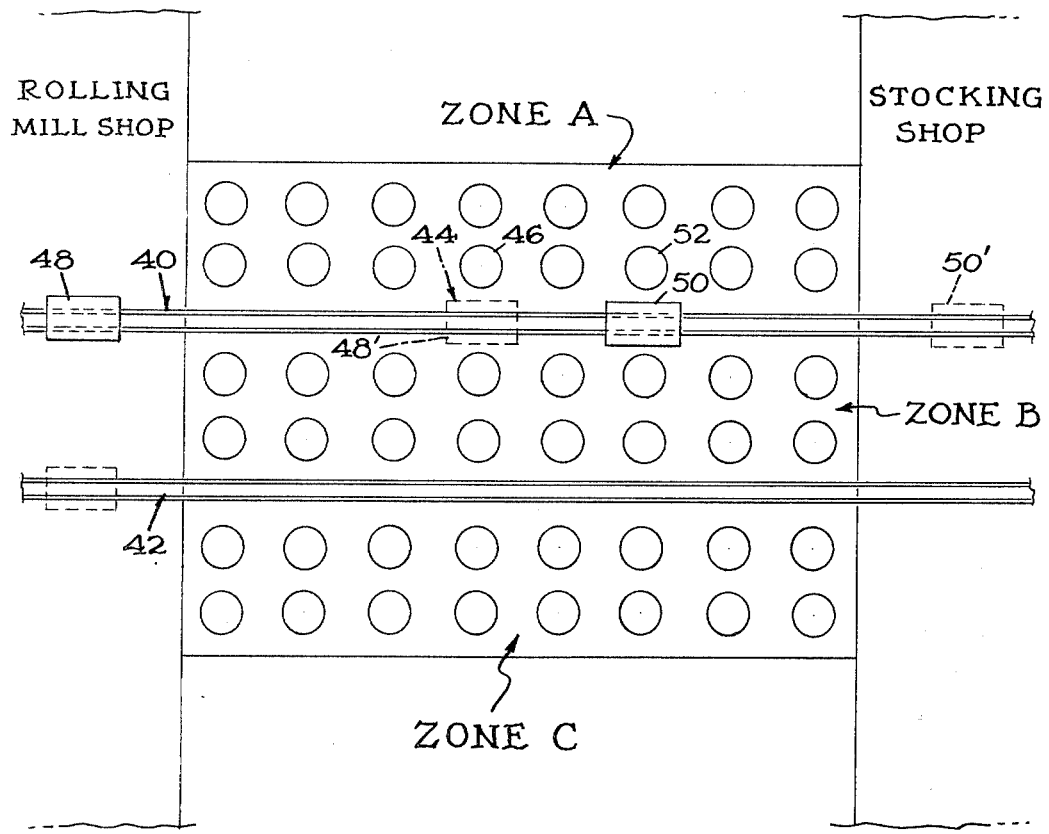
FIGURE 9 is a schematic top plan view of part of a rolling mill shop in which the improved traction vehicle and roadway are installed.

Referring to FIGURES 1 and 2, a twin-axle wagon 1 heavily loaded, for instance, with sheet metal coils (not shown) is disposed on rails 2 of the track. A pulling carriage is coupled to the wagon to move it over the track. The carriage is formed by a strong heavy duty frame 3 having at one end two steering wheels 4 having rubber tires 4a and mounted with provision for rotation through 360° around a vertical axis; an upright 5 receives a drive shaft (not shown) which changes the orientation of the wheels 4 via in actuating arm 6 enabling manoeuvres to be carried out.

At its other end the frame 3 is mounted via boxes 3a on an axle 7 bearing a train of metal tired driving wheels 8 which run on rails. The axle 7 has at its ends boxes 9 attached to two lateral longitudinal members, as 10, co-operating with struts 10a to form a frame. Each of the longitudinal members 10 is continued by an arm, as 11, terminating in a lug 12 taking the form of a bearing bush. Mounted on the strong frame 3 are a driving motor 13, a torque converter 14, a clutch 15 and a reduction gear 16. The primary pinion of the reduction gear 16 is acted upon by a hydraulic brake 18 which in turn is acted upon by a spring safety brake 18a. The reduction gear 16 drives the axle 7 and therefore the wheels 8 via a chain 17 seen in FIG. 1.

The chain 17a (FIG. 2) extends over the pinion 7a keyed to the axle 7 and transmits the movement thereof to one of a train of rubber tired wheels 20. When fluid pressure operated rams 21 articulated between ends 10b of the longitudinal members 10 and the frame 3 are in the retracted position, the position of the longitudinal members 10 is close to the horizontal; the steering wheels 4 and the rubber tired wheels 20 are resting on the ground, whereas the metal tired wheels 8 are raised to a certain level.

When the torque converter 14 is engaged and the brakes are released, the movement of the motor 13 is transmitted from an adequate torque to the reducing gear 16 and via the chain 17 drives the axle 7. The axle 7 drives via the chain 17a the wheels 20, which become driving wheels, and the carriage can be manoeuvred into any position, more particularly into the axis of the track adjacent the wagon 1; at that instant the raised wheels 8 are above the rails 2. The pulling means can then be stopped, and the rams 21 can be actuated to lift the ends 10b of the longitudinal members 10 and lower the lugs 12 to below the level of the axle boxes 1a; the wheels 20 leave the ground and the wheels 8 are applied to the rails 2. If the clutch 15 is engaged, via the transmission explained hereinbefore the wheels 8 become driving wheels, the pulling carriage moves partially under the wagon and the lugs 12 of the inclined longitudinal members are located under the axle boxes 1a. When this position has been reached, the rams 21 are actuated in the opposite direction to lower the ends 10b of the longitudinal members 10, which tilt around the axle 7 and tend to raise the wagon by their lugs 12. However, since the wagon is much heavier than the frame 3 the latter is raised and occupies the overhung or suspended position diagrammatically shown in FIG. 1, in which the frame 3 abuts supports 22 borne by the wagon 1; the wheels 4, 20 have left the ground; the wheels 8 are on the rails 2 and their axle 7 supports a portion of the load of the wagon 1 to which the pulling carriage is thus coupled. The wheels 8 driven by the engine have therefore acquired an adequate grip to enable the wagon 1 to be moved and braked. As soon as the wagon has arrived in the required place, the pulling carriage is uncoupled by the performance in reverse of the operations described hereinbefore, so that the wheels 4, 20 are returned to the ground, the wheels 8 being raised. The pulling carriage can then move with great manoeuvrability outside the rails on the rubber tired wheels 20 and is not impeded at the end of the track by the load-carrying wagon.

In the embodiment diagrammatically illustrated in FIGURES 3 and 4 the heavy load (not shown) to be moved is disposed on load-carrying means in the form of a table-like body 25 having supporting feet 26 disposed on either side of rails 26a of the track. The height of the legs to which the feet 26 are attached is such that the whole of a carriage 27 can move under the table. The pulling vehicle or chariot 27 is of the self-propelled type and formed by a strong frame 28 having wheels 28a running on the rails 26a. Disposed in the frame 28 are the various driving elements more particularly an engine, a torque converter, a clutch, a reducing gear and a brake device. The latter elements are only schematically illustrated in dotted outline and not described, since they are relatively immaterial to the understanding of the invention. Clearly, such elements are similar to the corresponding elements described hereinbefore with reference to FIGURES 1 and 2.

Mounted at the top of the frame 28 are suitable fluid pressure operated lifting means such as hydraulic rams, as 29. The simultaneous actuation of the rams 29 enables the table 25 and the load (not shown) to be lifted and borne by complementary means 29a on the carriage 27. The wheels 28a of the carriage 27 therefore possess the necessary grip to convey the table to any place on the track as soon as the starting control is actuated, or to brake the table when it has arrived at the required place on the track.

FIGURES 3 and 4 show a train formed by two carriages coupled to one another and each bearing a table-like body. This embodiment can have a known remote control device schematically designated as RC operably connected in a well-known manner to the drive and other operating components, in which case according to the invention articulated feeler arms 30 similar to half a pantograph are mounted on the front and the rear of the carriage. As soon as the arms 30 abut any object on the track, means 19 interconnected therewith actuate the brake device in a well-known manner enabling the carriage to be stopped over a short distance, since it moves forward slowly. An example of a similar articulated feeler mechanism may be seen in the U.S. Patent No. 1,579,928 which discloses an articulated vehicle bumper mechanism with related circuits which operates a signal, but which signal or circuitry also could be used to apply a suitable brake device.

The embodiment shown in FIGS. 5 and 6 also comprises a train formed by two carriages each bearing a table-like body and is in every way similar to the embodiment shown in FIGS. 3 and 4, except as regards the drive; in FIGS. 5 and 6 elements identical with those shown in FIGURES 3 and 4 have the same references.

Referring to FIGURES 5 and 6, a pulling and load-carrying carriage 27 having at one end a driver's cab 32 slides under the table 25. The driver's cab 32 has a panel 31 bearing more particularly the controls for starting and braking the carriage and for actuating the rams.

In the embodiments illustrated in FIGURES 3–6, the carriage passes with ease under the table and is never impeded at the end of the track, since the carriage can move in either direction; moreover, it readily lends itself to remote control.

FIGURES 7 and 8 relate to a particularly advantageous construction of the table feet. The feet are formed by two channel irons 33 ("Zorrès") telescoped over a portion of their length and clipped to one another by straps 34, just as in sliding metal support systems in mines. The bottoms of the feet have plates 35 to which bases 36 having raised edges are attached by nuts screwed on bolts 38 with the interposition of a rubber block 37.

This assembly is satisfactory, since any force exceeding the friction set up between the two channel irons causes them to slide inside one another without being deformed before reaching a stop; moreover, feet thus constructed have to be constantly supervised and serviced to prevent the channel irons from sliding as far as the stop, and it is easy to restore the starting position; lastly, the base with raised edges prevents excessive local stresses.

The driving motor for the carriages shown in the embodiments in FIGURES 1–6 is preferably a low power high speed petrol engine, such as a motor car engine having a power of the order of 40 H.P. As a result of the high degree of reduction and the multiplication of the torque of the hydraulic converter, a low power motor can exert tractional forces of the same order of magnitude as those of an industrial locomotive of 300 H.P. and a weight of about 10 tons. The device according to the invention limits the speed of movement of the carriage, which is of the order of 5 kilometres per hour. In the first embodiment illustrated, the transmission, via a chain, of the movement of the axle having metal tired wheels to the rubber tired wheels is an advantage, since it obviates the use of an expensive speed-changing system.

Moreover, the braking system operative on the primary pinion of the reducing gear is produced by an inexpensive hydraulic brake, so that no brake bands or shoes acting on the wheels are needed; a spring safety brake is also preferably associated with the hydraulic brake.

The traction vehicles or carriages described hereinbefore are of relatively light weight and can be used inter alia to convey metallurgical products such as, for instance, sheet metal coils which can each weigh about 30 tons.

FIG. 9 is representative of an illustrative installation of the traction vehicles within a rolling mill shop, wherein the shop comprises three zones, A, B and C of the reheating furnaces for laminated products coming from a neighboring rolling chain. Between these zones are provided a roadway preferably comprising two sets of roller tracks 40 and 42 connecting the rolling mill shops to a stocking shop. In this manner a vehicle according to FIGS. 3–6 of the present application travelling upon the roller tracks 40 can transport to a position at 44 adjacent a furnace 46 to be loaded, a table-like body 48 of laminated products which has been previously loaded into the rolling mill shop.

During the operation of physically loading the products from the table-like body designated 48 in its position 44 into the furnace 46, the same vehicle can move into the stocking shop, as at 50', a table 50 which has been loaded with the products received arriving from another furnace 52.

During the discharge of the products from the body 50 into the stocking shop, the vehicle can likewise retrieve from the location 44 the table body 48, which in the meantime has been discharged, and return it to the rolling mill shop, and so on.

This rapid handling is only possible due to the combination of utilizing several tables and a traction vehicle as disclosed herein capable of reciprocating below them. If the vehicle were unable to pass entirely under each of the table-like bodies, it would be necessary either to provide several vehicles upon each roller-track, or to provide a lateral track along each of the roller-tracks.

It is an apparent advantage that where the vehicle travels upon such a roller-track it never risks being blocked at any one end of the track by a load placed upon one of the table-like bodies. This latter arrangement is advantageous over other known arrangements, including that represented herein by FIGS. 1 and 2, wherein it is necessary to provide the vehicle with expensive and time-consuming means to displace it from the roller track upon another side roller track.

What I claim is:

1. In combination, wheeled traction vehicle means adapted to operate along a predetermined roadway, with load-carrying body means adapted to be selectively interengagingly lifted and transported on said vehicle along said roadway, comprising:
    (a) a self-propelled, multi-wheel, traction vehicle including motor and drive means imparting substantial tractive effort thereto;
    (b) said vehicle including fluid-pressure operated lifting means for lifting and supporting said body means;
    (c) a plural-legged table-like body having load-carrying support means, and means to receive said vehicle-mounted lifting means for interengaging and lifting said load-carrying body, and
    (d) said legs of said body being of predetermined height and spacing sufficient for said vehicle to pass completely beneath said body from either direction along said roadway.

2. The combination as defined in claim 1 wherein the vehicle includes brake means operably connected with and operable to effect braking of said vehicle wheels.

3. The combination as defined in claim 2 wherein the vehicle includes means to operate it in forward and reverse direction, and each vehicle includes articulated feeler means projecting from at least one end of said vehicle, and having means connecting said feeler means with and to actuate said brake means responsive to engagement by said feeler means to a predetermined extent with any object in its way on said roadway.

4. The combination as defined in claim 1 wherein the fluid-pressure operated lifting means of paragraph (b) includes a plurality of hydraulically actuated extensible and retractable lifting rams disposed generally on opposite ends of said vehicle to engage with ram-receiving means of and for lifting said body, during transit thereof.

5. The combination as defined in claim 1 further comprising remote operating means including means on said vehicle for receiving operating signals to selectively operate said motor and fluid-pressure operated lifting means.

6. The combination as defined in claim 1 wherein the wheeled traction vehicle means includes a train of at least two interconnected vehicles, and a load-carrying body adapted to be carried by each of said connected vehicles.

7. The combination as defined in claim 1 further including means forming at least at one end of said vehicle an operator's cab and means for providing all operational controls disposed within said cab.

8. The combination as defined in claim 1 wherein the roadway and vehicle wheels are of a complementary railroad type.

9. The combination as defined in claim 1 wherein the legs of the table-like, load-carrying body each comprise two telescopic channel leg members and strap members embracing said leg members to selectively hold them together at a predetermined height.

10. The combination as defined in claim 9 wherein each leg includes a foot plate and a rubber-like, shock-absorbing block member interposed between said foot plate and the lower adjacent end of said leg to which it is attached.

(References on following page)

References Cited

UNITED STATES PATENTS

| | | | |
|---|---|---|---|
| 164,863 | 6/1875 | Murphy | 105—75 |
| 639,483 | 12/1899 | Woodall | 105—75 |
| 2,043,507 | 6/1936 | Culemeyer | 214—500 |
| 1,089,964 | 3/1914 | Rice | 105—276 XR |
| 1,227,819 | 5/1917 | Murphy | 105—276 XR |
| 1,579,928 | 4/1926 | Groesbeck | 340—61 |
| 1,852,287 | 4/1932 | Bragg et al. | 188—106 XR |
| 1,985,169 | 12/1934 | Howell et al. | 214—502 |
| 2,027,421 | 1/1936 | Eisenberg | 214—502 |
| 2,618,009 | 11/1952 | Tinnerman | 248—24 XR |
| 2,718,195 | 9/1955 | Bock et al. | 105—75 XR |
| 2,793,719 | 5/1957 | Langerbein | 248—354 XR |
| 2,893,665 | 7/1959 | Paulsen | 248—24 |
| 2,959,449 | 11/1960 | Lazich | 188—2 XR |
| 3,024,931 | 3/1962 | Grover et al. | 214—517 |
| 3,238,896 | 3/1966 | Minenko et al. | 105—26 |
| 3,259,218 | 7/1966 | Black et al. | 192—3.5 |

ARTHUR L. LA POINT, Primary Examiner

HOWARD BELTRAN, Assistant Examiner

U.S. Cl. X.R.

104—1; 105—1, 3, 26, 75, 215, 364; 188—110; 192—4; 214—16, 502; 248—24, 354, 357; 293—5; 340—61